Patented Dec. 14, 1937

2,102,052

UNITED STATES PATENT OFFICE 2,102,052

FISH BAIT AND METHOD OF MAKING THE SAME

George W. Yearley, Geneva, Ohio, assignor to The American Fork & Hoe Company, Cleveland, Ohio, a corporation of Ohio No Drawing. Application March 3, 1936, Serial No. 66,945

5 Claims. (Cl. 99—3)

This invention relates to pork rind fish bait and particularly to the methods of making the same.

Heretofore, pork rind has been used as fish bait. In order, however, to render such pork rind bait suitable for manufacturing in quantities and suitable for commerce, it has been necessary to keep the finished bait pieces in a wet solution to prevent them from decomposing and from becoming hard and stiff and useless as bait. Such prior commercial pork rind bait, therefore, has been packed in jars immersed in liquid and the disadvantages thereof for this reason are readily apparent.

By means of the process contemplated by the present invention, pork rind strips may be manufactured in dry form and sold, shipped and distributed in that form, and at the time of use may be converted into suitable pork rind bait simply by the process of wetting them.

One of the objects of the invention, therefore, is to provide a method by which pork rind bait may be made for sale and distribution in dry form and which will promptly assume the desired characteristics of pork rind bait by wetting the same.

Another object is to provide a process of the character referred to which will be inexpensive and reliable and which will not cause deterioration of the dry pork rind prepared thereby even if stored against future use for relatively long periods of time.

Other objects will be apparent to those skilled in the art to which my invention appertains.

In preparing pork rind for use as bait as above referred to according to my invention, pork rind is used in the form in which it is obtained commercially from packing houses, that is to say, in a dry salted state. The rind, in relatively large pieces, is thoroughly washed in warm water to remove the packing salt and other foreign material which may be thereon and is then trimmed and skived to the desired thickness and is cut to the length, shape and size of the pork rind bait finished product. If desired, it may be at this stage of the process retained in the uncut or slab form received from the packing house.

Pork rind bait of the kind heretofore used which must be kept continuously wet is well known as to its shape, length and size, and it is believed unnecessary to further describe the same herein in these respects.

After the rind is removed from the warm washing bath above referred to, it is again rinsed in water and is then impregnated with a so-called "driving agent" or "wetting agent". For such driving agent I prefer to employ commercial products which are sold under various trade names but essentially comprising a double sulphate of sodium combined with fatty alcohol and generally termed sodium alkyl sulphates. All of these sodium sulphates are made from various soap oils by reducing the fatty acid molecule to the corresponding alcohol form and then combining with sulphuric acid and soda to form a true sodium sulphate. When impregnated with such substances, the skin or rind will thereafter have the property of absorbing water and regaining its natural appearance and properties much more readily than if the process is performed thereon without this impregnation.

The rind is next dehydrated. This step of process I prefer to perform by placing the rind in a bath composed of a polyhydric alcohol such as glycerol maintained at a concentration greater than fifty per cent. by weight. Treatment of the rind in this bath removes sufficient of the remaining water from the rind to prevent decomposition or putrefaction and also prevent the rind from becoming stiff and hard when dry.

After removing the rind from this dehydration bath, the excess chemical of the bath is removed from the rind by draining and it is then mechanically kneaded or worked preferably in a chamber maintained at a high state of humidity. This kneading process breaks down the fiber in the rind and renders it more pliable and at the same time allows it to take up a small quantity of water, which I have found desirable.

The principal steps of the process, therefore, consist of dehydrating the rind to such an extent that it will not decompose or putrefy; treating or "stuffing" it with a polyhydric alcohol to prevent hardening thereof and impregnating it with a so-called "driving agent" to hasten the rate at which it will re-absorb water when wetted at the time of use.

I claim:

1. The method of making artificial fish bait which includes cutting a piece from a slab of pork rind and forming it to a shape suitable for artificial bait, washing it in warm water to remove impurities, impregnating it with a sodium alkyl sulphate, dehydrating it with a polyhydric alcohol maintained at a concentration in excess of 50% by weight, mechanically kneading it to render it pliable.

2. The method of making artificial fish bait which includes impregnating a strip of pork rind with a sodium alkyl sulphate, dehydrating the same by a polyhydric alcohol solution and mechanically kneading it to render it pliable.

3. The method of making artificial fish bait which includes washing dry salted pork rind to remove foreign material, shaping pieces cut therefrom to a desired bait form, impregnating the pieces with a sodium alkyl sulphate, and dehydrating the pieces with a polyhydric alcohol concentrate in excess of 50% by weight.

4. An artificial fish bait comprising a strip of pork rind impregnated with a sodium alkyl sulphate adapted to effect rapid absorption of water by the rind, and containing a polyhydric alcohol adapted to act as a de-hydrating agent.

5. The method of making artificial fish bait which includes forming a piece of pork rind to a shape suitable for artificial bait, impregnating the rind with a sodium alkyl sulphate, dehydrating the rind to prevent decomposition by immersion in a bath containing a polyhydric alcohol in excess of 50% by weight, removing excess chemical therefrom by washing, and kneading the rind to render it relatively pliable.

GEORGE W. YEARLEY.